US012607315B1

(12) United States Patent
Ji

(10) Patent No.: US 12,607,315 B1
(45) Date of Patent: Apr. 21, 2026

(54) PROJECTION LAMP CAPABLE OF CREATING FLOATING OR FLUTTERING-LIKE EFFECT

(71) Applicant: Zhongshan Yong Qi Electronic Co., Ltd., Zhongshan (CN)

(72) Inventor: Shaoqi Ji, Zhongshan (CN)

(73) Assignee: ZHONGSHAN YONG QI ELECTRONIC CO., LTD., Zhongshan (CN)

( * ) Notice: Subject to any disclaimer, the term of this patent is extended or adjusted under 35 U.S.C. 154(b) by 0 days.

(21) Appl. No.: 19/235,649

(22) Filed: Jun. 12, 2025

(51) Int. Cl.
*F21S 10/00* (2006.01)

(52) U.S. Cl.
CPC .................................. *F21S 10/007* (2013.01)

(58) Field of Classification Search
None
See application file for complete search history.

(56) References Cited

U.S. PATENT DOCUMENTS

| | | | | |
|---|---|---|---|---|
| 10,830,410 B1 * | 11/2020 | Wei | F21V 23/02 | |
| 11,692,680 B1 * | 7/2023 | Yang | F21S 6/002 | 362/257 |
| 11,698,187 B1 * | 7/2023 | Zheng | F21V 3/04 | 362/86 |
| 12,085,242 B1 * | 9/2024 | Zheng | F21V 14/06 | |
| 2019/0132544 A1 * | 5/2019 | Xi | F21S 8/032 | |
| 2024/0053664 A1 * | 2/2024 | Shu | G03B 23/105 | |

* cited by examiner

*Primary Examiner* — Christopher E Dunay
(74) *Attorney, Agent, or Firm* — HOWARD M COHN and Associates, LLC

(57) ABSTRACT

Disclosed is a projection lamp capable of creating a floating or fluttering-like effect, including a housing, a front cover, a core assembly, and a film disk assembly. The core assembly is installed inside the housing. The front cover covers one end of the housing. A first glass sheet is arranged in a middle portion of the front cover. The core assembly includes a third-lens bracket, a third lens, a water ripple sheet, a cover plate, a film holder, a second lens, a first lens, a travel switch, a lamp board bracket, a lamp board, a motor, a control board, and the film disk assembly. According to the utility model, the water ripple sheet is driven to do a reciprocating motion, and when passing through the water ripple sheet, light is refracted in different directions, so that a projected image presents a floating or fluttering-like dynamic effect.

6 Claims, 3 Drawing Sheets

PROJECTION LAMP CAPABLE OF CREATING FLOATING OR FLUTTERING-LIKE EFFECT

TECHNICAL FIELD

The utility model relates to the technical field of projection lamps, and in particular to a projection lamp capable of creating a floating or fluttering-like effect.

BACKGROUND

In the technical field of existing projection lamps, most of images projected by conventional projection lamps are static pictures, with relatively monotonous effects. Even though some projection lamps can achieve dynamic projection, their dynamic effects are limited to simple pattern switching or color changes, failing to present a realistic and lively effect similar to objects floating or fluttering in space. In numerous application scenarios such as decoration and display, users have an urgent demand for projection effects with greater visual impact and artistic sense, but existing projection lamps struggle to meet this demand.

SUMMARY

An objective of the utility model is to provide a projection lamp capable of creating a floating or fluttering-like effect, to solve the problems provided in the above background.

In order to achieve the above objective, the utility model provides the following technical solution: a projection lamp capable of creating a floating or fluttering-like effect, including a housing, a front cover, a core assembly, and a film disk assembly. The core assembly is installed inside the housing, and the front cover covers one end of the housing. A first glass sheet is arranged in a middle portion of the front cover. The core assembly includes a third-lens bracket, a third lens, a water ripple sheet, a cover plate, a film holder, a second lens, a first lens, a travel switch, a lamp board bracket, a lamp board, a motor, a control board, and the film disk assembly. The third lens and the water ripple sheet are sequentially installed from left to right in a middle portion of the third-lens bracket. Legs of the third-lens bracket are inserted and connected into a surface of the lamp board. The lamp board bracket is installed on one side of the lamp board, and the control board is installed on an other side of the lamp board. The travel switch is installed on one side of the lamp board bracket. The first lens is installed inside the lamp board bracket. A bottom of the lamp board bracket is fixedly connected to an output end of the motor. The film holder is installed in a middle portion of the lamp board bracket. The second lens is installed inside the film holder. The cover plate is arranged on one side of the film holder, and the film disk assembly is inserted between the film holder and the cover plate.

Preferably, a slot is formed in a top of the housing, and one end of the film disk assembly penetrates through the slot and is placed outside the housing, facilitating a user to rapidly and conveniently replace the film disk assembly, thereby achieving projection of different patterns and effects, and meeting diverse use requirements.

Preferably, a power cord is installed at an other end of the housing, and the motor is installed inside the housing.

Preferably, the film disk assembly includes a film disk, a second glass sheet, a film, a third glass sheet, and a film cover.

Preferably, a groove is formed on one side of the film disk, and the second glass sheet, the film, and the third glass sheet are installed on one side of the groove from left to right, and the groove is covered with the film cover.

Preferably, a sealing ring is arranged between the front cover and the first glass sheet. An arrangement of the sealing ring ensures sealing performance between the front cover and the first glass sheet, thereby effectively preventing dust, moisture, etc. from entering an interior of the projection lamp, improving the stability, and prolonging the service life of the projection lamp.

Compared with the prior art, the utility model has the beneficial effects:

according to the utility model, by driving the lamp board bracket to rotate through the motor, the water ripple sheet is driven to do a reciprocating motion, and when passing through the water ripple sheet, light is refracted in different directions, so that a projected image presents a floating or fluttering-like dynamic effect, breaking through static or simple dynamic limitations of conventional projection lamps, and greatly enhancing visual impact and artistic sense. The slot is formed in the top of the housing, and one end of the film disk assembly penetrates through the slot and is placed outside the housing, facilitating the user to rapidly and conveniently replace the film disk assembly, thereby achieving projection of different patterns and effects, and meeting diverse use requirements.

In the figures: 1—housing; 101—slot; 2—front cover; 201—sealing ring; 202—first glass sheet; 3—core assembly; 301—third-lens bracket; 302—third lens; 303—water ripple sheet; 304—cover plate; 305—film holder; 306—second lens; 307—first lens; 308—travel switch; 309—lamp board bracket; 310—lamp board; 311—motor; 312—control board; 4—film disk assembly; 401—film disk; 402—second glass sheet; 403—film; 404—third glass sheet; 405—film cover; and 5—power cord.

DETAILED DESCRIPTION

The technical solutions in the embodiments of the utility model will be described clearly and completely below in combination with the accompanying drawings in the embodiments of the utility model.

Figure 1:
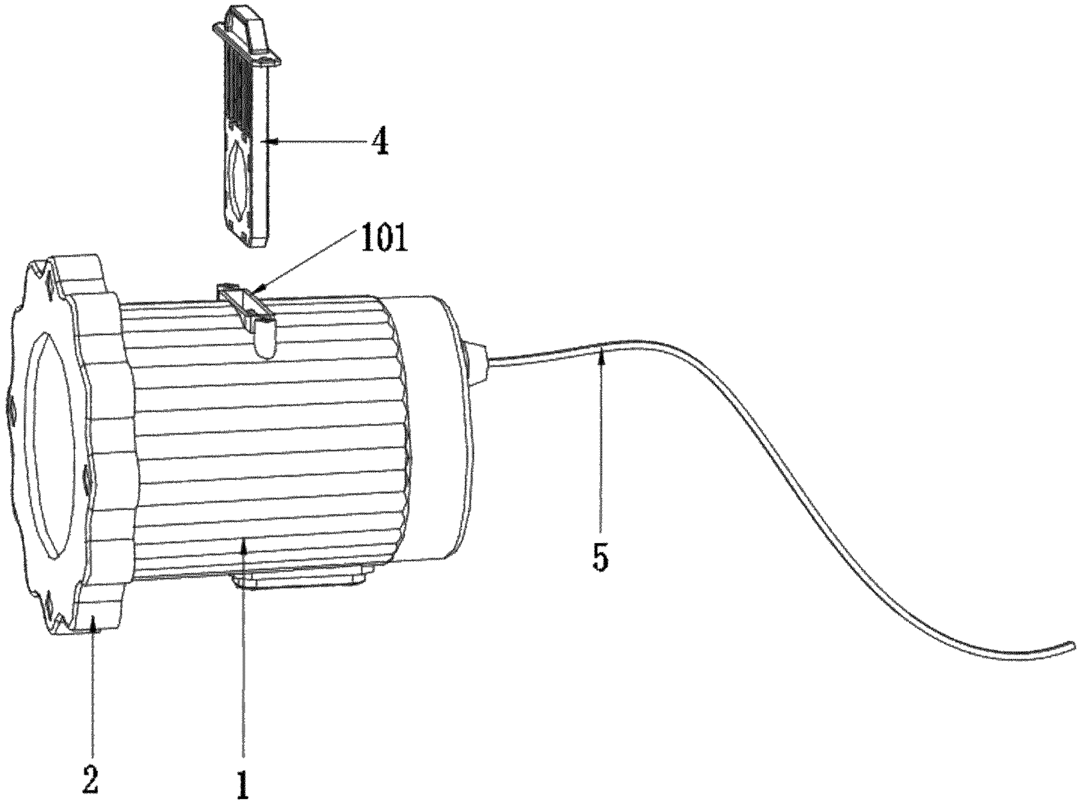
FIG. 1 is a schematic structural diagram of the utility model.
Figure 2:
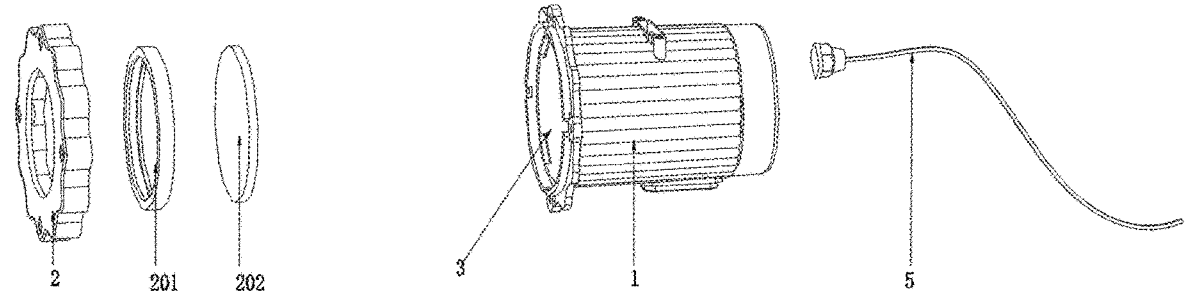
FIG. 2 is an exploded view of the utility model.
Figure 3:
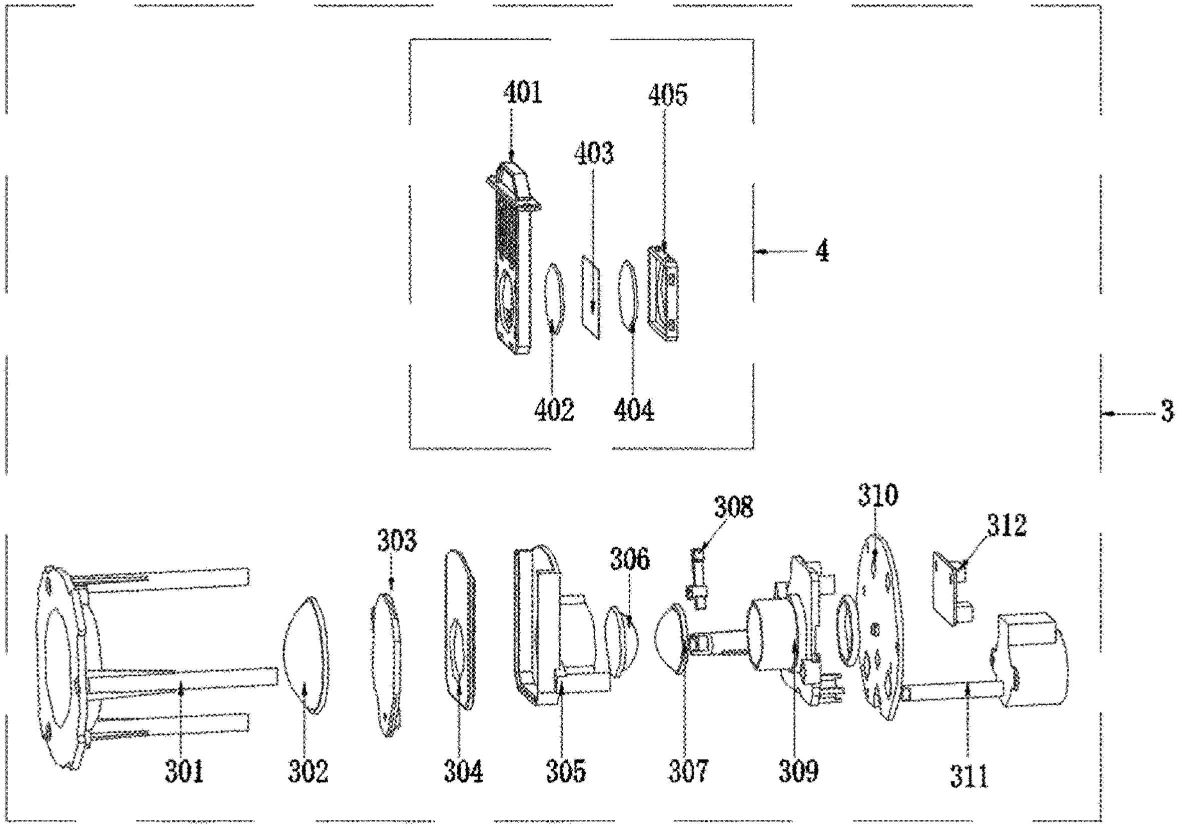
FIG. 3 is an exploded view of a core assembly of the utility model.
Figure 4:
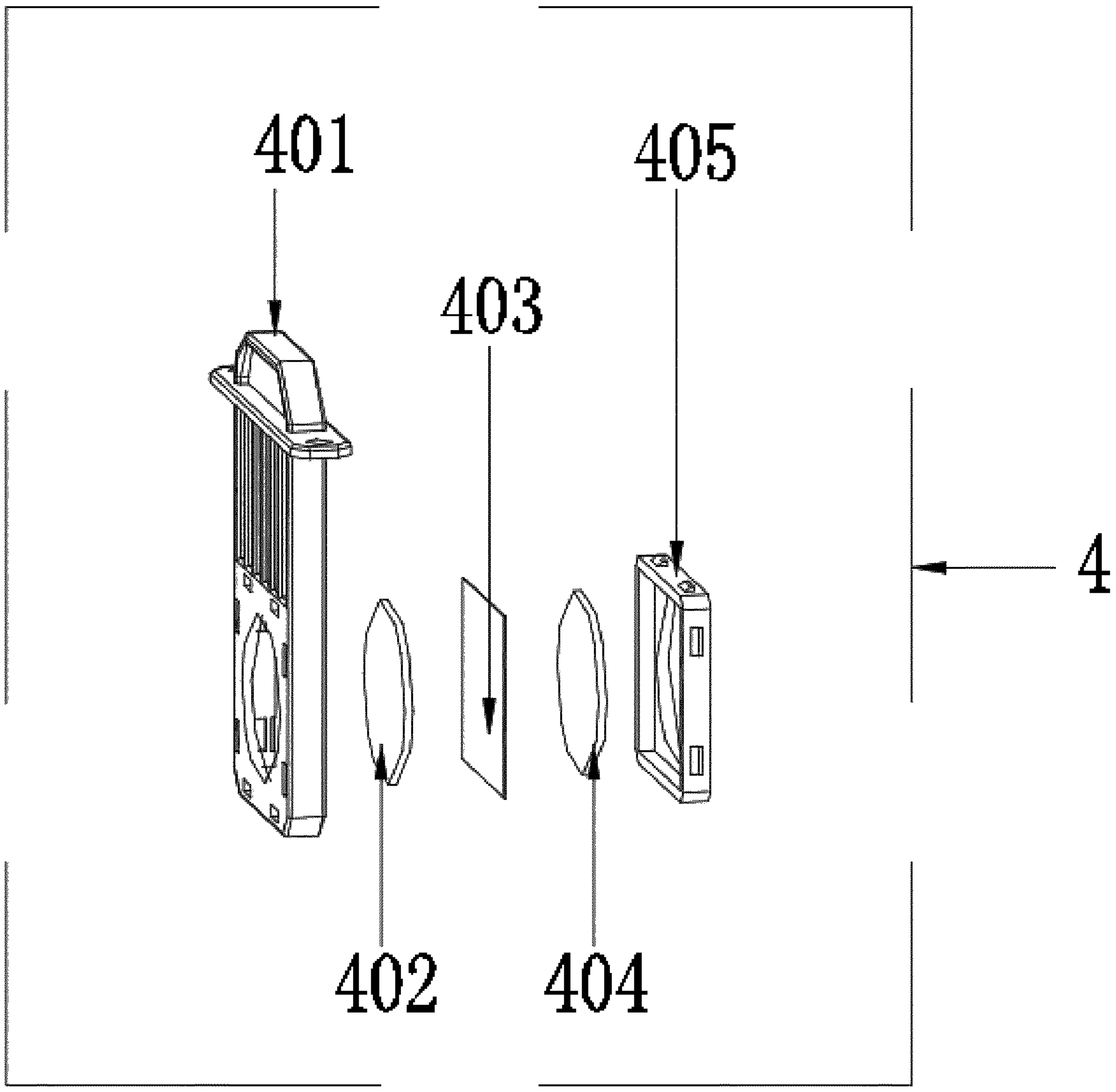
FIG. 4 is an exploded view of a film disk of the utility model.

Referring to FIG. 1 to FIG. 4, the utility model provides a projection lamp capable of creating a floating or fluttering-like effect, including a housing 1, a front cover 2, a core assembly 3, and a film disk assembly 4. The core assembly 3 is installed inside the housing 1, and the front cover 2 covers one end of the housing 1. A first glass sheet 202 is arranged in a middle portion of the front cover 2. The core assembly 3 includes a third-lens bracket 301, a third lens 302, a water ripple sheet 303, a cover plate 304, a film holder 305, a second lens 306, a first lens 307, a travel switch 308, a lamp board bracket 309, a lamp board 310, a motor 311, a control board 312, and the film disk assembly 4. The third lens 302 and the water ripple sheet 303 are sequentially installed from left to right in a middle portion of the third-lens bracket 301. Legs of the third-lens bracket 301 are inserted and connected into a surface of the lamp board 310. The lamp board bracket 309 is installed on one side of the lamp board 310, and the control board 312 is installed on an other side of the lamp board 310. The travel switch 308 is installed on one side of the lamp board bracket 309. The first lens 307 is installed inside the lamp board bracket 309. A bottom of the lamp board bracket 309 is fixedly connected to an output end of the motor 311. The film holder 305 is installed in a middle portion of the lamp board bracket 309. The second lens 306 is installed inside the film holder 305. The cover plate 304 is arranged on one side of the film holder 305, and the film disk assembly 4 is inserted between the film holder 305 and the cover plate 304.

A slot 101 is formed in a top of the housing 1, and one end of the film disk assembly 4 penetrates through the slot 101 and is placed outside the housing 1.

Specifically, the slot 101 functions as allowing a user to quickly and conveniently replace the film disk assembly 4. During actual use, the user only needs to pull out one end of the film disk assembly 4 from the slot 101 and then insert a new film disk assembly 4. There is no need to disassemble the housing or other components of the entire projection lamp, which greatly improves the replacement efficiency and convenience.

A power cord 5 is installed at an other end of the housing 1, and the motor 311 is installed inside the housing 1.

Specifically, an arrangement of the power cord 5 is used to supply power to electrical components inside the projection lamp.

The film disk assembly 4 includes a film disk 401, a second glass sheet 402, a film 403, a third glass sheet 404, and a film cover 405. A groove is formed on one side of the film disk 401, the second glass sheet 402, the film 403, and the third glass sheet 404 are installed on one side of the groove from left to right, and the groove is covered with the film cover 405.

Specifically, the film 403 is printed with specific patterns or textures. When light passes through the film 403, these patterns or textures are projected, creating a specific visual effect. The second glass sheet 402 and the third glass sheet 404 are located on a front side and a rear side of the film 403, playing a role in protecting and enhancing a light transmission effect, and ensuring the clarity and quality of a projected image. The film cover 405 is used to fix and protect the entire film disk assembly 4, thereby preventing the film disk assembly from being damaged during use. Additionally, an overall design of the film disk assembly 4 can allow the film disk assembly to be conveniently inserted into and pulled out from the film holder 305, facilitating the user to replace different film disk assemblies 4 according to actual needs, so as to achieve diverse projection effects.

A sealing ring 201 is arranged between the front cover 2 and the first glass sheet 202.

Specifically, an arrangement of the sealing ring 201 ensures sealing performance between the front cover 2 and the first glass sheet 202, thereby effectively preventing dust, moisture, etc. from entering an interior of the projection lamp, improving the stability, and prolonging the service life of the projection lamp.

During specific use, when the projection lamp works, lamp beads on the lamp board 310 emit light. The light first passes through the first lens 307 for preliminary convergence and adjustment and then illuminates the film disk assembly 4. The film 403 is printed with the specific patterns or textures. After passing through the film 403, the light carries pattern information on the film 403 and then is further focused by the second lens 306 to make the patterns clearer.

Meanwhile, the motor 311 drives a bottom of the lamp board bracket 309 to rotate, and the lamp board bracket 309 drives components such as the film holder 305 and the water ripple sheet 303 to move together. The water ripple sheet 303 oscillates in a reciprocating manner under an action of the motor 311. When the light passes through the water ripple sheet 303, refraction in different directions may be generated due to an oscillation of the water ripple sheet 303, resulting in dynamic changes in a transmitted light and making a projected pattern appear to have a floating or fluttering-like effect.

The travel switch 308 is used to limit an oscillation position of the water ripple sheet 303. When the water ripple sheet 303 oscillates to a set position, the travel switch 308 is triggered, and a feedback signal is sent to the control board 312. The control board 312 adjusts a rotational speed and a rotational direction of the motor 311 to avoid cumulative errors during the oscillation of the water ripple sheet 303 and ensure a stable reciprocating motion.

The control board 312 may also control a color, brightness, etc. of the light on the lamp board 310. In conjunction with a dynamic refraction effect of the water ripple sheet 303, the visual effect of the projection is further enriched. After being adjusted again by the third lens 302, the light is projected to an external space through the first glass sheet 202 in the middle portion of the front cover 2, thereby forming a projected image with a floating or fluttering effect.

Although the utility model has been described in detail with reference to the above embodiments, those skilled in the art may still modify the technical solutions recorded in the above various embodiments or equivalently replace part of the technical features therein. Any modification, equivalent replacement, improvement, and the like made within the spirit and principle of the utility model shall be included in the protection scope of the utility model.

What is claimed is:

1. A projection lamp capable of creating a floating or fluttering-like effect, comprising a housing (1), a front cover (2), a core assembly (3), and a film disk assembly (4), wherein the core assembly (3) is installed inside the housing (1), the front cover (2) covers one end of the housing (1), a first glass sheet (202) is arranged in a middle portion of the front cover (2), the core assembly (3) comprises a third-lens bracket (301), a third lens (302), a water ripple sheet (303), a cover plate (304), a film holder (305), a second lens (306), a first lens (307), a travel switch (308), a lamp board bracket (309), a lamp board (310), a motor (311), a control board (312), and the film disk assembly (4), the third lens (302) and the water ripple sheet (303) are sequentially installed from left to right in a middle portion of the third-lens bracket (301), legs of the third-lens bracket (301) are inserted and connected into a surface of the lamp board (310), the lamp board bracket (309) is installed on one side of the lamp board (310), the control board (312) is installed on an other side of the lamp board (310), the travel switch (308) is installed on one side of the lamp board bracket (309), the first lens (307) is installed inside the lamp board bracket (309), a bottom of the lamp board bracket (309) is fixedly connected to an output end of the motor (311), the film holder (305) is installed in a middle portion of the lamp board bracket (309), the second lens (306) is installed inside the film holder (305), the cover plate (304) is arranged on one side of the film holder (305), and the film disk assembly (4) is inserted between the film holder (305) and the cover plate (304).

2. The projection lamp capable of creating the floating or fluttering-like effect according to claim 1, wherein a slot (101) is formed in a top of the housing (1), and one end of the film disk assembly (4) penetrates through the slot (101) and is placed outside the housing (1).

3. The projection lamp capable of creating the floating or fluttering-like effect according to claim 1, wherein a power cord (5) is installed at an other end of the housing (1), and the motor (311) is installed inside the housing (1).

4. The projection lamp capable of creating the floating or fluttering-like effect according to claim 1, wherein the film disk assembly (4) comprises a film disk (401), a second glass sheet (402), a film (403), a third glass sheet (404), and a film cover (405).

5. The projection lamp capable of creating the floating or fluttering-like effect according to claim 4, wherein a groove is formed on one side of the film disk (401), the second glass sheet (402), the film (403), and the third glass sheet (404) are installed on one side of the groove from left to right, and the groove is covered with the film cover (405).

6. The projection lamp capable of creating the floating or fluttering-like effect according to claim 1, wherein a sealing ring (201) is arranged between the front cover (2) and the first glass sheet (202).

* * * * *